United States Patent [19]

King

[11] Patent Number: 4,706,505
[45] Date of Patent: Nov. 17, 1987

[54] FORCE AND TORQUE SENSOR

[75] Inventor: Steven M. King, Westboro, Mass.

[73] Assignee: Barry Wright Corporation, Newton Lower Falls, Mass.

[21] Appl. No.: 801,114

[22] Filed: Nov. 22, 1985

[51] Int. Cl.$^4$ .......................... G01L 5/16; H01C 10/12
[52] U.S. Cl. ............................... 73/862.04; 73/862.33; 73/862.64; 338/114
[58] Field of Search ........... 73/862.04, 862.05, 862.06, 73/862.64, 862.68, 862.36, 862.33; 338/47, 99, 100, 114; 178/18

[56] References Cited

U.S. PATENT DOCUMENTS

| | | | |
|---|---|---|---|
| 1,080,937 | 12/1913 | Stephens | 73/862.58 |
| 2,752,558 | 6/1956 | Kane | 338/114 X |
| 4,389,711 | 6/1983 | Hotta et al. | 178/18 X |
| 4,440,031 | 4/1984 | DeFazio | 73/862.04 |
| 4,492,949 | 1/1985 | Peterson et al. | 338/114 |

Primary Examiner—Charles A. Ruehl
Attorney, Agent, or Firm—Milton E. Gilbert

[57] ABSTRACT

A low cost sensor is described. The sensor is responsive to the component of a force applied to the sensor relative to an axis of the sensor. The sensor comprises rigid, spaced-apart support members. At least one pair of electrically-conductive elements are positioned to move with the support members in response to the force, contact and compress against one another as the force component varies relative to the axis such that the electrical impedance between the two elements changes as said component of force changes.

29 Claims, 11 Drawing Figures

FORCE AND TORQUE SENSOR

The present invention relates generally to robotics and, more particularly, to a relatively inexpensive force and/or torque sensor adapted to be used in robotic applications.

With the advent of robotics, various sensors have been developed for providing the functional equivalent to the various senses which human workers are naturally endowed, e.g., sight, hearing, etc.

Touch is of particular importance in application, such as delicate and detailed assembly tasks. Accordingly, various tactile sensors have been developed, such as shown and illustrated in Kennucan, Paul; "How Smart Robots Are Becoming Smarter", High Technology Magazine, Sept./Oct., pp. 32-36, Technology Publishing Company; Hillis, William Daniel, "Active Touch Sensing", A. I. Memo 629, Massachusetts Institute of Technology, Artificial Intelligence Laboratory, April 1981; British Published Applications Nos. 2145555A and 2115556A; and U.S. Pat. Nos. 740,787; 2,752,558; 3,509,296; 3,836,900; 4,014,217; 4,050,756; 4,145,317 and 4,208,648. Also, see Copending U.S. patent application Ser. No. 476,685, filed Mar. 18, 1983 by Robert R. Peterson et al., and assigned to the present assignee, now U.S. Pat. No. 4,492,949. Such tactile sensors have been known to employ resilient materials connected in an electrical circuit and constructed to interact with other components so as to change their impedances when compressed in response to a compression force and give a measure of the magnitude and in some instances the location of the compression force.

Other types of sensors are force and torque sensors. The latter are used to measure, for example the force (compression or tension) and/or torque, on a robotic arm. Examples of commercially available force and torque sensors are: the FT System sold by the Lord Corporation of Philadelphia, Penn.; the JR3 Universal Force-moment Sensor System marketed by JR3, Inc., of Woodland, Calif; the R-1500 Force Feedback Wrist sold by Buckminster Corporation of Somerville, Massachusetts; and the Astek 6-Axis force Sensor manufactured by Barry Controls, a wholly owned subsidiary of Barry Wright Corporation of Watertown, Mass., the present assignee. These latter systems are relatively complicated and complex, and, therefore, relatively expensive. Accordingly, many applications requiring inexpensive, yet reliable, force and/or torque sensors cannot be economically implemented with these systems.

Accordingly, an object of the present invention is to provide a force and/or torque sensor which reduces or overcomes the above-noted problem of the prior art.

A more specific object of the present invention is to provide a relatively inexpensive, yet reliable, sensor for sensing compression and/or tension, and/or torque relative to such sensor axis.

Another object of the present invention is to provide a relatively inexpensive, yet reliable, sensor for generating electrical signals representative of compression and/or tension, and/or torque applied with respect to a sensor axis, which signals can be easily processed with a simple processing circuit.

These and other objects of the present invention are achieved by an improved sensor responsive to the component of a force applied to the sensor relative to a predetermined axis of the sensor. The sensor comprises a pair of outer support members, each made of a relatively rigid material, means for spacing the support members from one another by a predetermined distance along the axis, means secured to and movable with one of the outer support members comprising at least one element made of a relatively resilient, electrically conductive material and means secured to and movable with the other of the outer support members comprising at least one other element made of a relatively resilient, electrically conductive material and positioned in an opposing relationship with the first mentioned resilient element. The resilient, electrically conductive elements contact and compress against one another as the force component varies relative to the axis such that the electrical impedance between the two resilient elements changes as the component of force changes.

As used herein, the term "on-axis" force shall mean the component of force, either compression or tension applied to the sensor along the axis of the sensor, while the term "off-axis" force shall mean the component of force, either compression or tension applied to the sensor in a direction parallel to and spaced from the axis of the sensor.

These and other objects of the present invention will in part be obvious and will in part appear hereinafter. The invention, accordingly, comprises the product possessing the features, properties and relation of components which are exemplified in the following detailed disclosure, and the scope of the application of which will be indicated in the claims.

For a fuller understanding of the nature and objects of the present invention, reference should be had to the following detailed description taken in connection with the accompanying drawings, wherein.

In the drawings, the same numbers are used to designate the same or similar parts.

In FIGS. 1-4, the force sensor 20A is adapted to sense compression forces applied to the sensor along and parallel to the center axis 22. The sensor 20A comprises a pair of outer support members 24A and 24B, preferably in the form of flat discs or plates, each made of a relatively rigid material. For example, each plate is made of an electrically insulative, abrasion resistant material, such as a non-conducting polymer or the sort of material typically used to fabricate printed circuit board substrates, e.g., resin-impregnated fiberglass. Means are provided for spacing the support members 24A and 24B so that the disc-shaped support members are in a mutually confronting, parallel-spaced relationship by a predetermined distance along the center axis 22. The axis 22 extends through and is normal to the general planes defined by the disc-shaped members 24. The spacing means preferably is in the form of a plurality of stand-off or support elements 26, each made of a relatively resilient material such as a natural rubber, neoprene or chloroprene having a hardness, for example, in the range of 55 durometer on the Shore A-2 scale, although, as will be evident hereinafter, the hardness of the material can be varied depending on the sensitivity of the device and other materials used. The resilient stand-offs or support elements 26 are each preferably directly bonded to the confronting faces of the outer supporting members 24A and 24B, with a suitable adhesive, such as an expoxy cement. The elements 26 are preferably equally spaced from the axis 22 and equally radially distributed around the axis 22.

Figure 2:
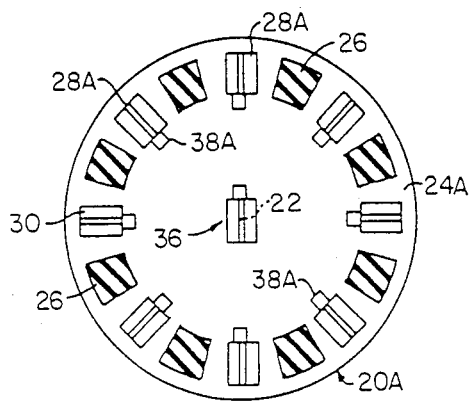
FIG. 2 is a sectional view taken along line 2—2 in FIG. 1.
Figure 1:
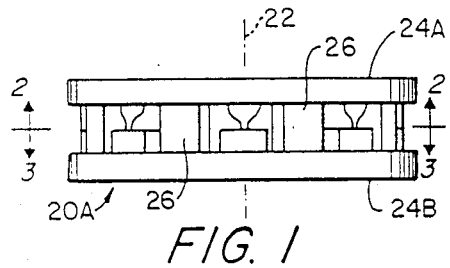
FIG. 1 is a side view of the preferred embodiment of the force sensor of the present invention adapted to sense compression forces.

The sensor 20A is also provided with means for sensing the component of both on and off axis compression forces applied to the sensor. The sensor can sense both the magnitude and location (as a function of distance and direction from the axis 22) of these compression forces. Preferably, the means for sensing the compression force comprises a first plurality of elements 28A made of a resilient, electrically conductive material and is secured to one of the support members 24A, and a second plurality of elements 28B also made of a resilient, electrically conductive material and secured to the other outer support member 24B. The elements 28A and the elements 28B are preferably secured respectively to the support member 24A and the support member 24B by a suitable adhesive such as an epoxy cement. The elements 28A are disposed on the support member 24A so that the are equally spaced from the axis 22 and equally circumferentially spaced around the axis. Each element 28A is preferably disposed between adjacent stand-off or support members 26. In a similar manner the elements 28B are disposed on the support element so that they are equally spaced from the axis 22, equally circumferentially spaced around the axis and each element 28B is opposed to and confronts and forms a pair with a corresponding element 28A. Preferably, as shown in FIGS. 1 and 2, and in greater detail in FIG. 4, each member 28A is block-shaped and symmetrically tapered to a narrower edge, on the side 30 facing opposing element 28B. As shown in FIG. 4, the tapered portion of each element is formed with a double curvature, indicated at 32, of a selected functional character with a projecting nose portion 34 so as to resemble the "hull" of a ship. Each element 28B is block-shaped and has a flat surface that confronts the corresponding element 28A of the respective pair. In the embodiment shown in FIGS. 1-3 an additional pair 36 of elements 28A and 28B are provided at the center of the sensor so that the axis 22 passes directly through the center of the two elements 28A and 28B of that pair. All of the elements 28A and 28B are preferably made of a polymeric elastomer, doped with a suitable conducting material, e.g., natural rubber, neoprene or chloroprene doped with carbon black particles. For reasons which will become more apparent hereinafter, elements 28A preferably are each made of a material harder and, therefore, less resilient than the element 28B. For example, where stand-offs 26 have a 55 durometer, as described above, a typical material of elements 28A is 70 or 80 durometer on the Shore A-2 Scale, while a typical material of elements 28B is approximately 40 durometer on the Shore A-2 Scale. Each element 28A and 28B is suitably provided with a wire 38 for connection to a suitable circuit, such as the type shown in FIG. 11, described hereinafter, so that each pair of elements 28A and 28B forms a variable impedance device.

When no compression force is applied to the sensor 20A along or parallel to the axis 22, only the nose portion 34 of each element 28A contacts the corresponding element 28B of the pair. However, when a compression force is applied to the sensor 20A along or parallel to axis 22, the elements 28A and 28B will compress against each other. Since element 28B is made of a softer material than element 28A of each pair, the effective surface area contact between the two elements of each pair will increase, decreasing the effective impedance provided by each pair of elements (because of the increase in contact area). As a result, the electrical contact impedance established between the conductive elements 28A and 28B of each pair in response to a compression force, tends to decrease, whereby for a given voltage applied between the two elements 28A and 28B, the current flow will increase in inverse relation to the changes in contact impedance. The "hull-shaped" cross-sectional shape of each element 28B is such that the pressure/current relationship of the sensor 20 tends to have a non-linear response of substantially logarithmic form which enables it to accurately reflect minute variances of pressure under very light loads as well as great variances of pressure under very heavy loads. It should be evident that the precise pressure/current relationship of the sensor 20 will depend also on a number of other factors, such as the thicknesses of the elements 28A and 28B, the compositions of the elements 28A and 28B, the relative hardness of the elements 28A and 28B and the hardness of the stand-offs or support members 26.

Figure 3:
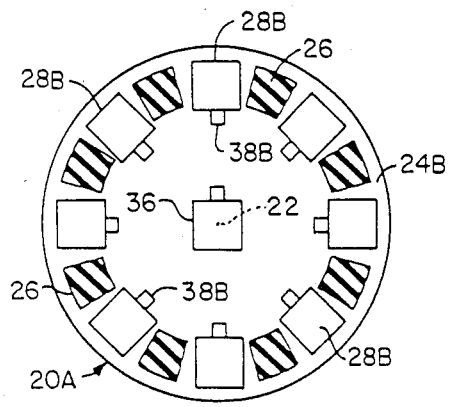
FIG. 3 is a sectional view taken along line 3—3 in FIG. 1.
Figure 4:
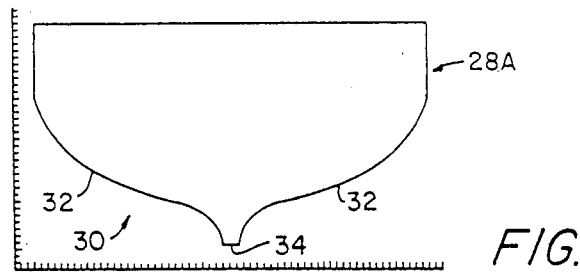
FIG. 4 is a cross-sectional view taken through the preferred contoured resilient electrically conductive element.
Figure 11:
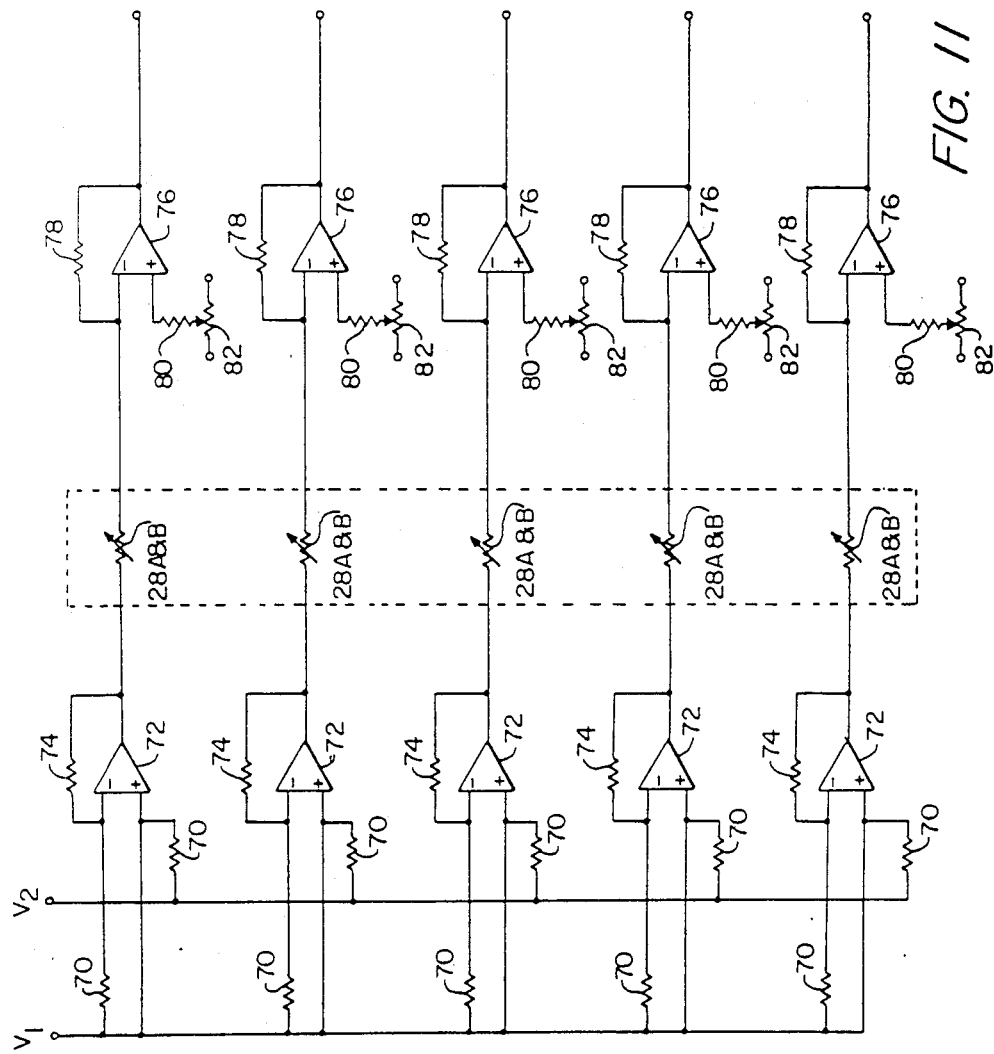
FIG. 11 is a schematic diagram of a typical electrical processing circuit for processing the electrical signals provided by the sensors of FIGS. 1-10.

By connecting the wires 38 of each pair of elements 28A and 28B to a suitable circuit such as shown in FIG. 11, the sensor 20, shown in FIGS. 1-3, can provide signals representative of the magnitude and position of on and off axis compression forces applied to the sensor 20A. Where an on-axis compression force is applied to the sensor 20A, each pair of elements 28A and 28B, including the pair 30, will compress an equal amount and provide an equal impedance. Where an off axis compression force is applied to the sensor at least some of the pairs of elements will be compressed by differing amounts depending upon the proximity of each such pair of elements to the point of application of the force.

Figure 6:
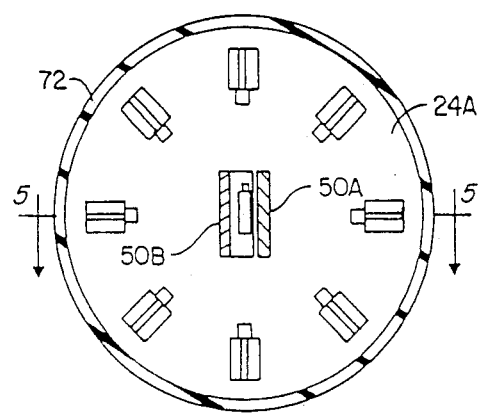
FIG. 6 is a sectional view taken along line 6—6 in FIG. 5.
Figure 5:
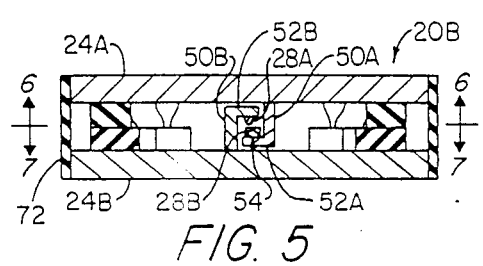
FIG. 5 is a sectional view of the preferred embodiment of the force sensor of the present invention adapted to sense compression and tension forces.
Figure 7:
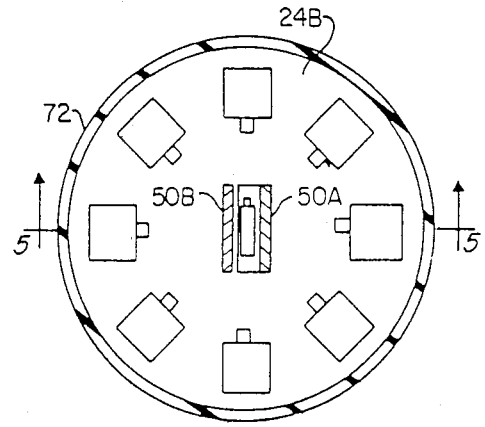
FIG. 7 is a sectional view taken along line 7—7 in FIG. 5.

The sensor 20 of FIGS. 1-3 can be modified to detect both compression forces as well as tension forces. One such sensor 20B is shown in FIGS. 5-7. Specifically, the center of each support member is provided with an L-shaped bracket 50, wherein bracket 50A is secured to support member 24A and bracket 50B is secured to support member 24B. Each bracket 50 is provided with an arm 52 for supporting the respective element 28 to form a pair of elements 28A and 28B. The brackets 54 are arranged in an overlapping manner so that the elements 28A and 28B of the pair 54 mutually oppose one another so that as the two support members 20 are pulled by a tension force along or parallel to the axis 22, the arms 52 of the brackets 50 are urged toward one another, compressing the two elements 28A and 28B of the pair 54. It will be evident that any number of pairs of elements shown in the sensors of FIGS. 1–3 and 5–7 can be used with similar brackets as substitutes for or in addition to the pairs used for sensing compression so as to also sense the location of off-axis tension forces.

Figure 9:
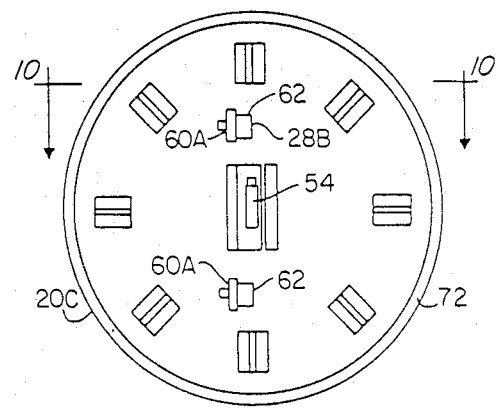
FIG. 9 is a sectional view taken along line 9—9 in FIG. 10.
Figure 10:
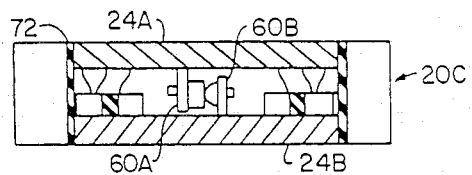
FIG. 10 is a sectional view taken along line 10—10 in FIGS. 8 and 9.
Figure 8:
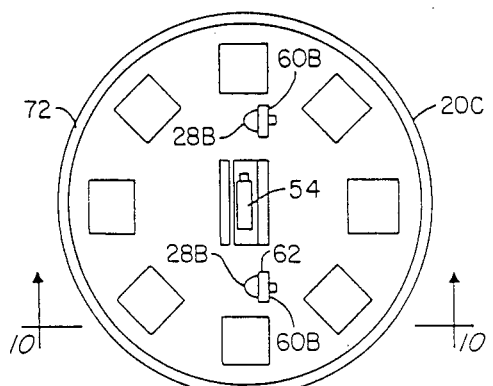
FIG. 8 is a sectional view taken along line 8—8 of FIG. 10 of the preferred embodiment of the force and torque sensor of the present invention adapted to sense compression and tension forces and torques applied in either angular direction about the sensor axis.

The sensor 20A and 20B of FIGS. 1–3 and 5–7 can also be modified to detect torque applied about one or both angular directions about the axis 22. For example, as shown in FIGS. 9–11, the sensor 20B of FIGS. 5–7 has been modified to include posts 60 to provide the sensor 20C. The posts 60 extend from the mutually confronting faces of the supporting members 24A and 24B at radially opposite sides of the tension sensing pair 54 of elements 28A and 28B so that elements 28A of the torque sensing pairs 62 face in one direction (to the right in FIG. 9) and members 28B of the torque sensing pairs face in the other direction (to the left in FIG. 8). As torque is applied to the sensor in one angular direction about the axis 22, one torque sensing pair 62 of the elements 28A and 28B is compressed together, while torque applied to the sensor in the other angular direction about the axis 22 results in the other torque sensing pair 62 of elements 28A and 28B compressing.

Any of the sensors shown in the drawings can be provided with suitable sealing means, such as the elastomer boot 72 shown in FIGS. 5–10 adapted to be sealed around the edge of the sensor.

FIG. 11 shows how each of the sensors 20, shown in FIGS. 1–3, 5–7 and 8–10, can be coupled into an electric circuit for use in industrial robotic applications. Specifically, a constant current source is provided for each pair of elements 28A and 28B. Each current source is formed by connecting two different D.C. voltage sources, $V_1$ and $V_2$, to identical input resistors 70. The latter, in turn, are connected respectively to the inverting and non-inverting input terminals of a voltage to current converter 72, one being provided for each pair of elements 28 (only five being shown for exemplary purposes). Each converter 72 is provided with feedback resistor 74 connected between inverting input and the output of the converter. The output of each converter 72 is connected to the wire 38 of one of the elements 28 of a corresponding pair, while the wire 38 of the other element 28 of the pair is connected to a second current converter 76. The latter is an operational amplifier having its inverting input connected to the wire 38 of one element 28 of the pair, and connected through the feedback resistor 78 to its output terminal. The noninverting input of the operational amplifier is connected through a resistor 80 to the tap of a potentiometer 82 so as to set the threshold of the amplifier in order to set the sensitivity of the sensor. The output of each amplifier 68, therefore, provides a current representative of the compression force, tension force or torque sensed by the respective pair of elements.

It should be evident that any combination of compression force sensing pairs of elements, tension force sensing pairs of elements, and torque sensing pairs of elements can be provided in the sensor 20. Additionally, the stand-offs of spacing elements 26 can be any number and of different shapes, such as a single circular ring of material of the same type of material as of elements 26 of a predetermined thickness concentrically mounted with respect to axis 22 between the two support members 24A and 24B. Further, each element 28A can be initially spaced from the corresponding element 28B so that a predetermined amount of force or torque, i.e., an offset, is required to bring them into contact with one another.

The sensor 20 is an inexpensive, yet reliable sensor for sensing compression, tension and/or torque applied to the sensor relative to the axis 22. The sensitivity of the sensor can be adjusted mechanically, for example, by modifying the resiliency of the stand-offs or support members 24, or electrically, for example, by adjusting the appropriate potentiometer 82.

Since certain changes may be made in the above products without departing from the scope of the invention herein involved, it is intended that all matter contained in the above description or shown in the accompanying drawings shall be interpreted in an illustrative and not in a limiting sense.

What is claimed is:

1. A sensor responsive to and being adapted to sense a force component applied to the sensor along an axis of the sensor, said sensor comprising:
    a pair of support members, each made of a relatively rigid material;
    means for spacing said support members from one another by a predetermined distance along said axis;
    means secured to one of said support members comprising a first plurality of elements, each of said elements of said first plurality being made of a relatively resilient, electrically-conductive material; and
    means secured to the other of said support members comprising a second like plurality of said elements, each of said elements of said second plurality being made of a relatively resilient, electrically-conductive material and paired with, in contact with and compressed against a corresponding one of said elements of said first plurality as said force component varies relative to said axis such that the electrical impedance between each element of said first plurality and the corresponding element of said second plurality changes as said component of force changes;
    wherein the pairs of said elements of said first and second pluralities are spaced around and radially spaced from said axis, and circumferentially spaced around said axis from one another, and said means for spacing said members from one another includes at least one support element made of a relatively resilient material disposed between and secured to each of said support members.

2. A sensor according to claim 1, wherein said electrically-conductive elements of one of said plurality of elements are of a harder material than said electrically conductive elements of the other said plurality of elements.

3. A sensor according to claim 2, wherein the harder electrically-conductive elements are formed so that said impedance varies substantially logarithmically with the magnitude of said force component within a predetermined range of magnitudes of force.

4. A sensor according to claim 3, wherein the portions of said harder electrically-conductive elements contacting and compressing against the other of said electrically conductive elements are tapered.

5. A sensor according to claim 1, wherein said pairs of elements of said first and second pluralities are equally radially spaced from said axis, and equally circumferentially spaced around said axis from one another.

6. A sensor according to claim 5, wherein said support element is of a material harder than the resilient, electrically-conductive elements of said first plurality and softer than the resilient, electrically-conductive elements of said second plurality.

7. A sensor according to claim 6, wherein said means for spacing said members from one another incudes a plurality of support elements spaced from and circumferentially spaced from one another around said axis between and secured to each of said members, each of said support elements being circumferentially disposed between adjacent pairs of said electrically-conductive elements of said first and second pluralities.

8. A sensor according to claim 6, wherein the harder electrically-conductive elements are formed so that said impedance varies substantially logarithmically with the magnitude of said force component within a predetermined range of magnitudes of force.

9. A sensor according to claim 8, wherein said portion of each of said harder electrically-conductive elements, contacting and compressing against each of the corresponding softer electrically-conductive elements, is tapered.

10. A sensor according to claim 1, wherein said support element is of a harder material than said resilient, electrically-conductive elements.

11. A sensor according to claim 1, wherein said means secured to said support members includes means for supporting said electrically-conductive elements relative to one another so that said electrically-conductive elements contact and compress against one another in response to compressive forces applied to said support members relative to one another along or parallel to said axis.

12. A sensor responsive to the component of a force applied to the sensor along or parallel to an axis of the sensor and torque applied to the sensor at least in one angular direction about said axis, said sensor comprising:
 a pair of support members, each made of a relatively rigid material;
 means for spacing said member from one another by a predetermined distance along said axis and for deforming in response to said component of force or said torque;
 means secured to one of said support members comprising at least first and second elements, each made of a relatively resilient, electrically-conductive material; and
 means secured to the other of said support members comprising at least third and fourth elements made of a relatively resilient, electrically-conductive material and positioned so that said third element is in an opposing relationship with said first element to form a first pair of said elements and said fourth element is in an opposing relationship with said second element so as to form a second pair of said elements;
 wherein said first pair of elements contact and compress against one another as said force component varies along said axis such that the electrical impedance between said first and third electrically-conductive elements changes as said component of force changes, and said second pair of elements contact and compress against one another as said torque is applied to said sensor about said axis in said one direction such that the electrical impedance between said second and fourth electrically-conductive elements changes as said torque is applied to said sensor about said axis in said one direction.

13. A sensor according to claim 12, wherein said sensor is adapted to sense torque applied in the other angular direction about said axis, said means secured to said one support member further comprising at least a fifth electrically-conductive element and said means secured to said other support member comprising at least a sixth electrically-conductive element positioned in an opposing relationship with said fifth electrically-conductive element, so that said fifth and sixth electrically-conductive elements contact and compress against one another in response to said torque applied in the other angular direction, such that the electrical impedance between said fifth and sixth elements changes as said torque applied in the other angular direction changes.

14. A sensor according to claim 12, wherein said means secured to said support members includes means for supporting said first and third electrically-conductive elements relative to one another so that said first and third electrically-conductive elements contact and compress against one another in response to compressive forces applied to said support members relative to one another along said axis.

15. A sensor according to claim 14, wherein said means secured to said one support member further includes at least a fifth resilient, electrically-conductive element and said means secured to said other support member further includes at least a sixth resilient electrically-conductive element positioned so that said sixth element is in opposing relationship with said fifth element and contacts and compresses with said fifth element in response to a tension force applied to said support members relative to one another along said axis, such that the electrical impedance between said fifth and sixth elements changes as said tension force changes.

16. A sensor according to claim 14, wherein said means secured to said one support member further includes at least a fifth resilient, electrically-conductive element and said means secured to said other support member further includes at least a sixth resilient, electrically-conductive element positioned so that said sixth element is in opposing relationship with said fifth element and contacts and compresses with said fifth element in response to torque applied in the other angular direction about said axis, such that the electrical impedance between said fifth and sixth elements changes as said torque changes.

17. A sensor according to claim 16, wherein said means secured to said one support member further includes at least a seventh resilient, electrically-conductive element and said means secured to said other support member further includes at least an eight resilient, electrically-conductive element positioned so that said eighth element is in opposing relationship with said seventh element and contacts and compresses with said seventh element in response to a tension force applied to said members relative to one another along said axis, so that the electrical impedance between said seventh and eighth elements changes as said tension force changes.

18. A sensor responsive to a tension or compression force applied to the sensor along an axis of the sensor and torque applied to the sensor in either angular direction about said axis, said sensor comprising:

a pair of support members, each made of a relatively rigid material;

means, including at least one support element made of a first relatively resilient material, for spacing said members from one another by a predetermined distance along said axis;

means secured to one of said support members comprising at least first, second, third and fourth elements, each made of a second relatively resilient, electrically-conductive material; and means secured to the other of said support members comprising at least fifth, sixth, seventh and eighth elements made of a third relatively resilient, electrically-conductive material and positioned so that said fifth element is in an opposing relationship with said first element to form a first pair of said electrically-conductive elements, said sixth element is in an opposing relationship with said second element to form a second pair of said electrically-conductive elements, said seventh element is in an opposing relationship with said third element to form a third pair of said electrically-conductive elements and said eighth element is in an opposing relationship with said fourth element to form a fourth pair of said electrically-conductive elements;

wherein said first pair of elements contact and compress against one another in response to compressive forces applied to said support members so that the impedance between said first pair of elements varies as a function of the magnitude of said compressive forces, said second pair of elements contact and compress against one another in response to tension forces applied to said support members so that the impedance between said second pair of elements varies as a function of the magnitude of said tension forces, said third pair of elements contact and compress against one another in response to torque applied to said sensor in one angular direction about said axis so that the impedance between said third pair of elements varies as a function of the magnitude of said torque applied in said one angular direction, and said fourth pair of elements contact and compress against one another in response to torque applied to said sensor in the other of said angular directions about said axis so that the impedance between said fourth pair of elements varies as a function of the magnitude of said torque applied in the other of said angular directions.

19. A sensor responsive to a torque applied to the sensor in at least one direction relative to an axis of the sensor, said sensor comprising:

a pair of support members, each made of a relatively rigid material;

means for spacing said support members from one another by a predetermined distance along said axis;

means secured to one of said support members comprising at least one element made of a relatively resilient, electrically conductive material; and means secured to the other of said support members comprising at least one other element made of a relatively resilient, electrically conductive material and positioned in an opposing relationship with said one element;

wherein said resilient, electrically conductive elements contact and compress against one another in response to said torque such that the electrical impedance between said elements changes as said torque changes.

20. A sensor according to claim 19, wherein one of said electrically-conductive elements is of a harder material than the other of said electrically-conductive elements.

21. A sensor according to claim 20, wherein the harder electrically-conductive element is formed so that said impedance varies substantially logarithmically with the magnitude of said torque within a predetermined range of magnitudes of torque.

22. A sensor according to claim 21, wherein the portion of said harder electrically-conductive element contacting and compressing against the other of said electrically conductive elements is tapered.

23. A sensor according to claim 19, wherein said means for spacing said members from one another includes at least one support element made of a relatively resilient element disposed between and secured to each of said support members, said support element being of a harder material than said resilient, electrically-conductive elements.

24. A sensor according to claim 19, wherein said sensor is adapted to sense torque applied in the other angular direction about said axis in response to the component of a force applied to said sensor relative to said axis, said means secured to said one support member further comprising at least a third electrically-conductive element and said means secured to said other support members comprising at least a fourth electrically-conductive element and positioned in an opposing relationship with said third electrically-conductive element, so that said third and fourth elements contact and compress against one another in response to said torque applied in the other angular direction, such that the impedance between said third and fourth elements changes in response to changes in said torque.

25. A sensor according to claim 24, wherein said means for spacing said members from one another includes at least one support element made of a relatively resilient element disposed between and secured to each of said support members, said support element being of a harder material than said resilient, electrically-conductive elements.

26. A sensor responsive to the component of a tension force applied to the sensor along or parallel to an axis of the sensor, said sensor comprising:

a pair of support members, each made of a relatively rigid material;

means for spacing said support members from one another by a predetermined distance along said axis;

means secured to one of said support members comprising at least one element made of a relatively resilient, electrically-conductive material; and means secured to the other of said support members comprising at least one other element made of a relatively resilient, electrically-conductive material and positioned in an opposing relationship with said one element;

wherein said resilient, electrically-conductive elements contact and compress against one another in response to said tension force component such that the electrical impedance between said elements changes as said component of tension force changes.

27. A sensor according to claim 26, wherein one of said electrically-conductive elements is of a harder material than the other of said electrically-conductive elements.

28. A sensor according to claim 27, wherein the harder electrically-conductive element is formed so that said impedance varies substantially logarithmically with the magnitude of said component of said force within a predetermined range of magnitudes of force.

29. A sensor according to claim 28, wherein the portion of said harder electrically-conductive element contacting and compressing against the other of said electrically-conductive elements is tapered.

* * * * *